United States Patent [19]

Robbins

[11] Patent Number: 4,932,218
[45] Date of Patent: Jun. 12, 1990

[54] AUTOMATIC CONTROL FOR EVAPORATIVE COOLERS AND THE LIKE

[76] Inventor: Maurice A. Robbins, 13137 Crewe St., North Hollywood, Calif. 91605

[21] Appl. No.: 261,098

[22] Filed: Oct. 24, 1988

[51] Int. Cl.⁵ .............................. F28D 3/00; F25D 7/00
[52] U.S. Cl. .......................................... 62/171; 62/175; 62/176.6; 236/44 B; 236/44 C; 261/26
[58] Field of Search ................ 62/171, 176.4, 176.6, 62/158, 121, 175, 311, 332; 236/44 B, 44 C, DIG. 9; 261/26, 27, DIG. 3, DIG. 43

[56] References Cited

U.S. PATENT DOCUMENTS

| | | | |
|---|---|---|---|
| 4,085,594 | 4/1978 | Mayer | 62/171 |
| 4,178,764 | 12/1979 | Rowe | 62/175 X |
| 4,502,288 | 3/1985 | Lynch | 236/44 B |
| 4,673,028 | 6/1987 | Meland | 62/171 X |
| 4,750,545 | 6/1988 | Hile et al. | 62/176.4 X |

Primary Examiner—Harry B. Tanner
Attorney, Agent, or Firm—Robert M. Sperry

[57] ABSTRACT

Improved means for automatically controlling an evaporative cooler having a pump and blower, said control system comprising a solid state electronic temperature sensing circuit capable of sensing temperature differences of considerably less than 0.1 degree Fahrenheit, a timer for activating the cooler pump a predetermined period prior to and following activation of the blower, logic means for controlling activation and cycling of said blower, and humidity sensing means for developing an electrical signal indicative of excessive atmospheric humidity for turning off said cooler and controlling an associated air conditioner.

10 Claims, 4 Drawing Sheets

AUTOMATIC CONTROL FOR EVAPORATIVE COOLERS AND THE LIKE

BACKGROUND

1. FIELD OF INVENTION

This invention relates to electronic control of evaporative coolers and is particularly directed to automatic means for controlling the operation of the pump and blower of an evaporative cooler, air conditioner or the like.

2. PRIOR ART

Evaporative coolers have been in use for many years as a relatively low-cost means of cooling residential and commercial buildings. As is well known, these devices comprise a pump for pumping water to permeate one or more porous pads, together with a one or two speed fan or blower for pulling air through the pads and delivering the air into the building. As the air is pulled through the water-soaked pads, the water is caused to evaporate which reduces the temperature of the air and the cooled air is then blown into the building to provide cooling. Generally, evaporative coolers require a; one switch for turning the water pump on and off and a second or combined switch for controlling the blower speeds. Furthermore, unless the water pump is turned on approximately five minutes prior to turning on the blower, unpleasant odors may be blown into the building along with blasts of hot air. This is the reason that evaporative coolers are often referred to, colloquially, as "swamp coolers".

Evaporative coolers are considerably less expensive to operate than air conditioners and, in regions of low humidity, such as the southwestern states, they are quite effective. However, as humidity increases, the efficiency of evaporative coolers decreases rapidly. Consequently, in some areas, it is necessary to combine both forms of cooling to obtain the advantages under the appropriate conditions.

Air conditioners are designed to operate in an ON-OFF cycle, controlled by a separate thermostat, to provide the desired cooling without requiring manual operation to turn the unit on and off. Furthermore, air conditioners operate by refrigerating the air and, hence, can reduce the air temperature rapidly to below the desired temperature and, thereafter, can cycle on and off to maintain an approximation of the desired temperature. For this purpose, temperature sensing mechanisms, such bi-metal thermostats, having an on-off differential of as about three degrees Fahrenheit are necessary. In recent years, attempts have been made to provide automatic controls for evaporative coolers. However, this presents very different problems than with air conditioners.

The requirements for such a system are herein listed:

Automatic System Requirements

A. Pre-soaking or pads requires a timing circuit to delay starting of the blower motor.
B. Most coolers employ two-speed blower motors which require a control logic to preclude both speed commands from being given simultaneously.
C. Coolers normally operate continuously during the day with rising space temperature. Evenings require removal of stored building heat while cooling ability is often low due to higher atmospheric humidity.
D. Heat sensors for use with evaporative coolers must have minimal self-heating and be free from heat generated by other components. They must be designed and located so as to precisely respond to space temperature changes.
E. During the evening cool-down, a means is necessary to keep the water pump functioning during blower cycling.
F. In combined evaporative cooler/air conditioner systems, to provide maximum economy and comfort within the cooled space, a continuous means of monitoring cooler effectiveness must be provided to prevent excessive use of energy by unnecessary operation of the air conditioner.

A search in the United States Patent Office has revealed the following:

| PATENT NO. | INVENTOR | ISSUED |
| --- | --- | --- |
| 4,232,531 | W. M. Mangum et al | Nov. 11, 1980 |
| 4,673,028 | B. C. Meland | June 16, 1987 |
| 4,698,979 | B. G. McGuigan | Oct. 13, 1987 |
| 4,085,594 | R. Mayer | Apr. 25, 1978 |
| 4,178,764 | J. R. Rowe | Dec. 18, 1979 |
| 4,502,288 | G. M. Lynch | Mar. 5, 1985 |
| 4,750,545 | J. R. Hile et al | June 14, 1988 |

The Mangum patent involves a conventional thermostat housed in common with control logic, along with power leads for the switching of cooler motors. Blower speed change is made by switch only. Blower delay is provided, but the pump is controlled by the thermostat and a switch. While providing the simplest solution to automatic control, this device fails to satisfy the requirements of Paragraphs B, C, D, E and F above.

The Meland control system is typical of prior art attempts to provide automatic control for evaporative coolers in that it fails to provide for pre-soaking of the pads and uses conventional thermostats for sensing the temperature, which are not suitable for cooler control, as mentioned above. The relay-type logic does provide for two-speed blower control. However, this system fails to meet the requirements of Paragraphs A, C and E, above, and is not intended for use in combined cooling systems.

The McGuigan patent discloses a combination evaporative cooler and air conditioner, constructed in a common enclosure, employing a thermostat to control switching from the evaporative cooler to the air conditioner. Aside from this, no control system for either the evaporative cooler or the air conditioner is disclosed and no details of the thermostat are revealed.

The Mayer patent covers the control of two-speed fans used to cool piped fluid in a cooling tower in the field of industrial control. Similarity consists of his need to thermally activate two-speed motors. To accomplish this, Mayer uses thermistors, a Wheatstone bridge balance and relays. Thermistors are non-linear and differ unit-to-unit, requiring hand calibration. Mayer employs relays for motor control and his logic is in three steps, not two. While there is some similarity to the present system, Mayer makes no suggestion relating to air coolers or to air conditioning.

The Rowe patent is quite pertinent and covers four modes of operation; of which Mode 2— evaporative cooler control and Mode 3— evaportative cooler and air conditioner automatic control are of concern. Rowe uses two thermostats, the "space" thermostat, sensing temperature within the cooled space, and a "duct" thermostat, sensing air temperature directly at the output of an evaporative cooler.

In Mode 2, only the "space" thermostat is used to control an evaporative cooler. As space temperature rises, the thermostat signals an electromechanical relay logic which provides blopwer delay for pad soaking. Provision is only made for a single speed motor and his thermostat is described at page 11, line 65, as ". . . a simple contact-type thermostat". While Rowe's system, in Mode 2, makes provision for pad pre-soaking, the relay logic uses 120 volt alternating current relays which dissipate heat and must be packaged separate from the thermostat. Moreover, the use of "a simple contact-type thermostat", while adequate for air conditioner use, will result in poor control of an evaporative cooler, as described elsewhere herein. No provision is made for two-speed blowers, which would require a logic revisionas shown in the Meland patent. Moreover, this portion of the Rowe patent fails to meet the requirements of Paragraphs B, C and E above. In the latter case, no provision is made for blower cycling or to remove the blower delay should cycling occur.

In Mode 3, both evaporative coolers and air conditioners are used in a system said to be ". . . responsive to the effectiveness of the evaporative cooler as it responds to relative humidity . . . and temperature of outside air . . . ". Two variations of the system are shown. The first uses duct temperature approaching a preset limit, while the second usess the difference between duct and space temperatures to stop the evaporative cooler and to start the air conditioner. The system, always starts with the cooler operating, with pad pre-soaking and a cool-down period, all of which are commendable. However, Mode 3 has the same thermostat and logic shortcomings as Mode 2. Moreover, with both "alternatives", high humidity and high temperature cause switchover to air conditioning which is invalid, since once the evaporative cooler has stopped, the duct thermostat becomes inactive and the system cannot respond to humidity changes. Thus, the air conditioner will keep running until the outdoor temperature is greatly reduced or manual control is used. This deficiency can only be overcome by having a sensor monitoring the outside air cooling ability at all times while the system is in operation. Furthermore, Rowe obviously does not meet the requirements of Paragraphs B, C, E and F, whereas the present invention fully overcomes these shortcomings.

The Lynch patent is pertinent only as it refers to his "monitoring head", which resembles Applicant's cooling sensor 66 of FIG. 3 only in that both use "wet bulb" evaporation to cool a thermistor sensor. However, the Lynch device is used to control humnidity in a plant-growing environment and, hence, is not truly pertinent.

The Hile patent concerns precision control of temperature and humidty in a research laboratory. Solid state circuitry is used, but not detailed. No evaporative coolers are used and the system is not truly pertinent.

BRIEF SUMMARY AND OBJECTS OF INVENTION

The shortcomings of the prior art are overcome by incorporating certain electronic components within the control system which previously were unavailable to this sector of the industry. The present invention involved careful study of evaporative cooler operating cycles and provides sensors and logic components to meet these needs in accordance with the aforementioned list of Automatic System Requirements. In accordance with the present invention, a standard five volt logic system includes a timer which permits, upon startup, a period for pad pre-soaking. A microcircuit thermal sensor is employed which activates separate comparators for low and high blower speeds. The logic system prevents simultaneous activation of both blower speeds and propvides three transistor followers intended to control a solid state motor control module, not covered in this invention. Separate controls, calibrated in degrees Fahrenheit, set the starting temperatures for each blower speed. The present control system may be expanded to control several evaporative coolers and also to control an evaporative cooler/air conditioner combination. The sensor comparator circuit provides a profound improvement in performance of evaporative coolers and an outdoor sensor controls a cooler/conditioner combination to achieve improved operating economy.

These and other objects and features of the present invention will be apparent from the following detailed description, wherein reference is made to the figures of the accompanying drawings.

DETAILED DESCRIPTION OF THE INVENTION

Figure 1:
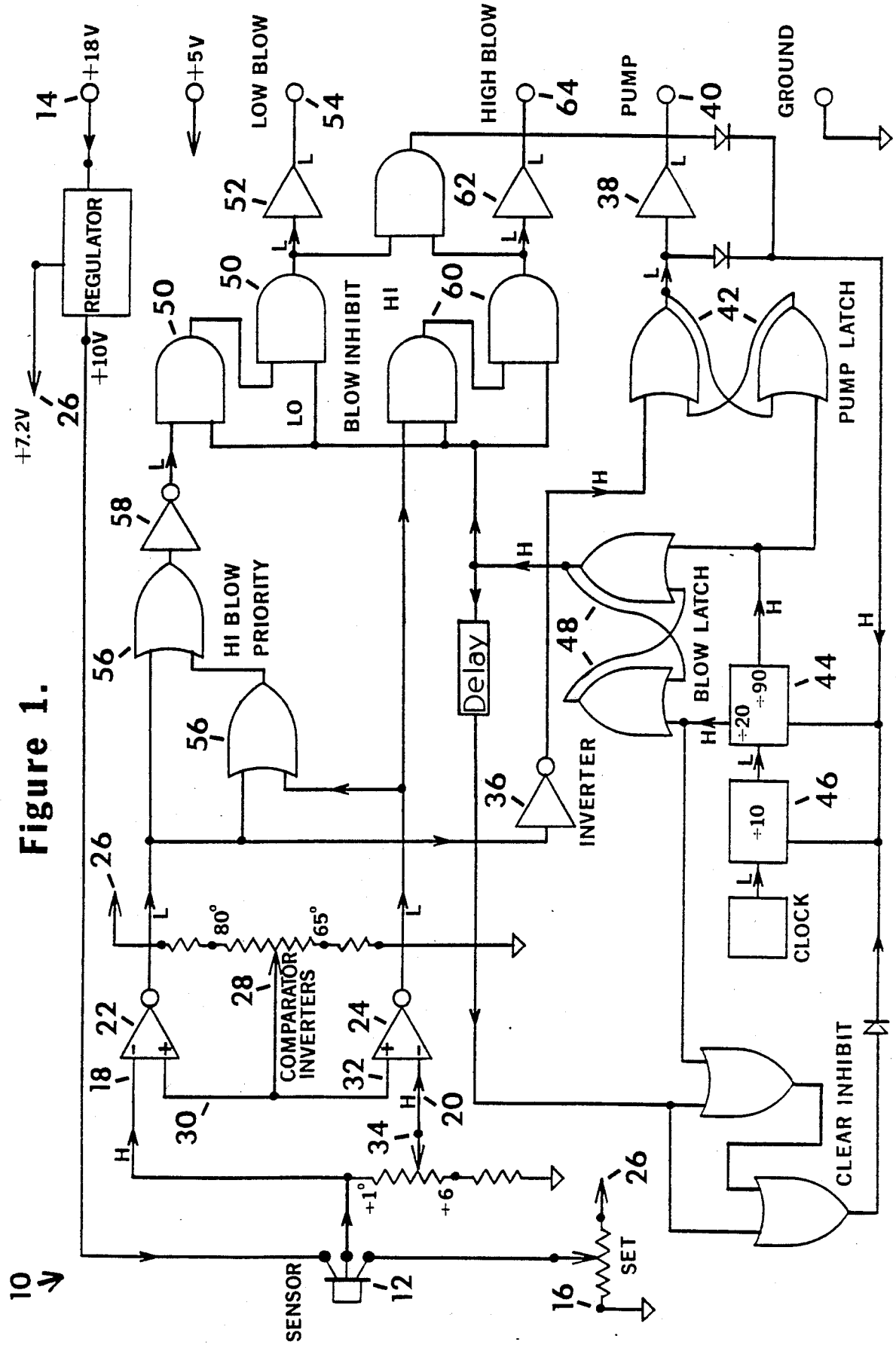
FIG. 1 is a diagrammatic representation of the electronic circuit of an automatic control system for evaporative coolers.

In that form of the present invention chosen for purposes of illustration in FIG. 1, the electronic circuit, indicated generally at 10, is shown for automatically controlling an evaporative cooler, not shown. The electronic circuit 10 comprises a solid state temperature sensor 12, such as an LM34DH, which is mounted in a position in which it is exposed to ambient temperature in the area whose temperature is to be controlled. Electronic temperature sensors, such as the LM34DH, have low thermal mass and are factory calibrated to produce electrical outputs of 10 millivolts per Fahrenheit degree change in ambient temperature and will respond within seconds of such a temperature change. The thermal sensor 12 is connected between a suitable voltage source 14 and callbration voltage 16 and supplies output signals to inputs 18 and 20 of a pair of comparators 22 and 24. Comparators 22 and 24 may be part of a LM339 unit, or the equivalent, and serve to compare the signal from thermal sensor 12 with the reference voltage of a precision regulator 26, which is supplied through potentiometer 28 to inputs 30 and 32, respectively, of comparators 22 and 24. When the voltage at inputs 18 and 20 of comparators 22 and 24 rises to within one millivolt of the preset reference voltage on inputs 30 and 32, the comparators 22 and 24 will switch "On". Comparators 22 and 24 operate in a similar manner. However, potentiometer 34 delays the signal to input 20 of comparator 24 by an amount equal to a temperature rise at sensor 12 of 1 to 6 degrees, depending upon the setting of potentiometer 34. Both potentiometers 28 and 34 are marked in degrees Fahrenheit and are set by the user.

In use, when the temperature starts to rise, sensor 12 generates a signal indicative of the temperature and supplies this signal to input 18 of comparator 22 and, through potentiometer 34 to input 20 of comparator 24. Comparators 22 and 24 compare the signal from sensor 12 with the reference voltage set by potentiometer 28. However, as noted above, potentiometer 34 serves to delay the signal from sensor 12 to input 20 of comparator 24 by an amount equal to one to six degrees, as selected. When the signal supplied by sensor 12 to input 18 of comparator 22 rises to within one millivolt of the signal supplied to input 30 of comparator 22 by the potentiometer 28, comparator 22 fires and passes a signal through inverters 36 and 38 to activate the pump 40 of the evaporative cooler. At the same time, the signal from comparator 22 triggers the pump latch circuit 42 and activates counters 44 and 46. After a suitable interval to allow for saturation of the cooler pads by the pump 40, counter 44 triggers blower latch circuit 48 and passes a signal through blower latch circuit 48, to low blower inhibitor circuit 50, and follower 52 to activate low speed windings 54 of the cooler blower. Note that signals at terminals 40, 54 and 64 are active when low (ground potential) and feed a switching unit using optoisolators and triac switches, to activate cooler motors.

If the temperature at sensor 12 continues to rise sufficiently to cause the signal supplied by sensor 12 through potentiometer 34 to input 20 of comparator 24 to rise to within one millivolt of the reference voltage set by potentiometer 28 to input 32 of comparator 24, comparator 24 will fire and will send a signal through high blow priority circuit 56 and inverter 58 to the low blower inhibitor circuit 50 to deenergize the low stage blower windings 54 and will also send a signal through high blower inhibitor circuit 60 and inverter 62 to activate the high stage windings 64 of the cooler blower. The cooler will continue to operate in this mode until the temperature at sensor 12 decreases significantly.

When the temperature measured by sensor 12 starts to drop, either because of successful cooler operation or due to outside factors, the signal generated by sensor 12 will start to decrease and, when the signal from sensor 12 through potentiometer 34 to input 20 of comparator 24 falls to more than five millivolts below the reference voltage supplied by potentiometer 28 to input 32 of comparator 24, comparator 24 will turn "Off" breaking the signal to the high speed blower priority circuit 56, the high speed blower inhibiter circuit 60 and follower 62 deenergizing the high speed blower windings 64 to halt the high speed blower operation. However, Breaking of the signal to the high speed priority circuit 56 will allow the signal from comparator 22 to again pass through the low speed blower inhibitor circuit 50 and follower 52 to reenergize the low speed blower windings 54. Note that comparator 24 has a hysteresis of 5 millivolts or 0.5° F. for optimum blower cycling between the HIGH blow and LOW blow.

As temperature fluctuations occur in the building, the control system 10 will cycle between high and low speed blower operation as required. Should the temperature measured by sensor 12 continue to fall, the signal from sensor 12 to input 18 of comparator 22 will, eventually, fall to more than one millivolts below the reference voltage set on potentiometer 28 to input 30 of comparator 22. When this occurs, comparator 22 will turn "Off". This will break the signals through low speed inhibitor 50 and follower 52 and will deenergize the low speed windings 54 to discontinue operation of the cooler blower. However, counter 44 will continue to hold the pump latch circuit 44 and the blower latch circuit 48 in the "On" condition for a suitable period after the low speed blower is deenergized to assure that the cooler pads will still be saturated if the temperature should rise and renewed operation of the blower should be needed. Thereafter, counter 44 will break the signals to the pump latch circuit 42 and blower latch circuit 48 to place the control system 10 in a "Rest" condition. Note that comparator 22 has a hysteresis of 2 millivolts or 0.2° F. for optimum blower cycling between LOW blow and OFF condition.

Figure 2:
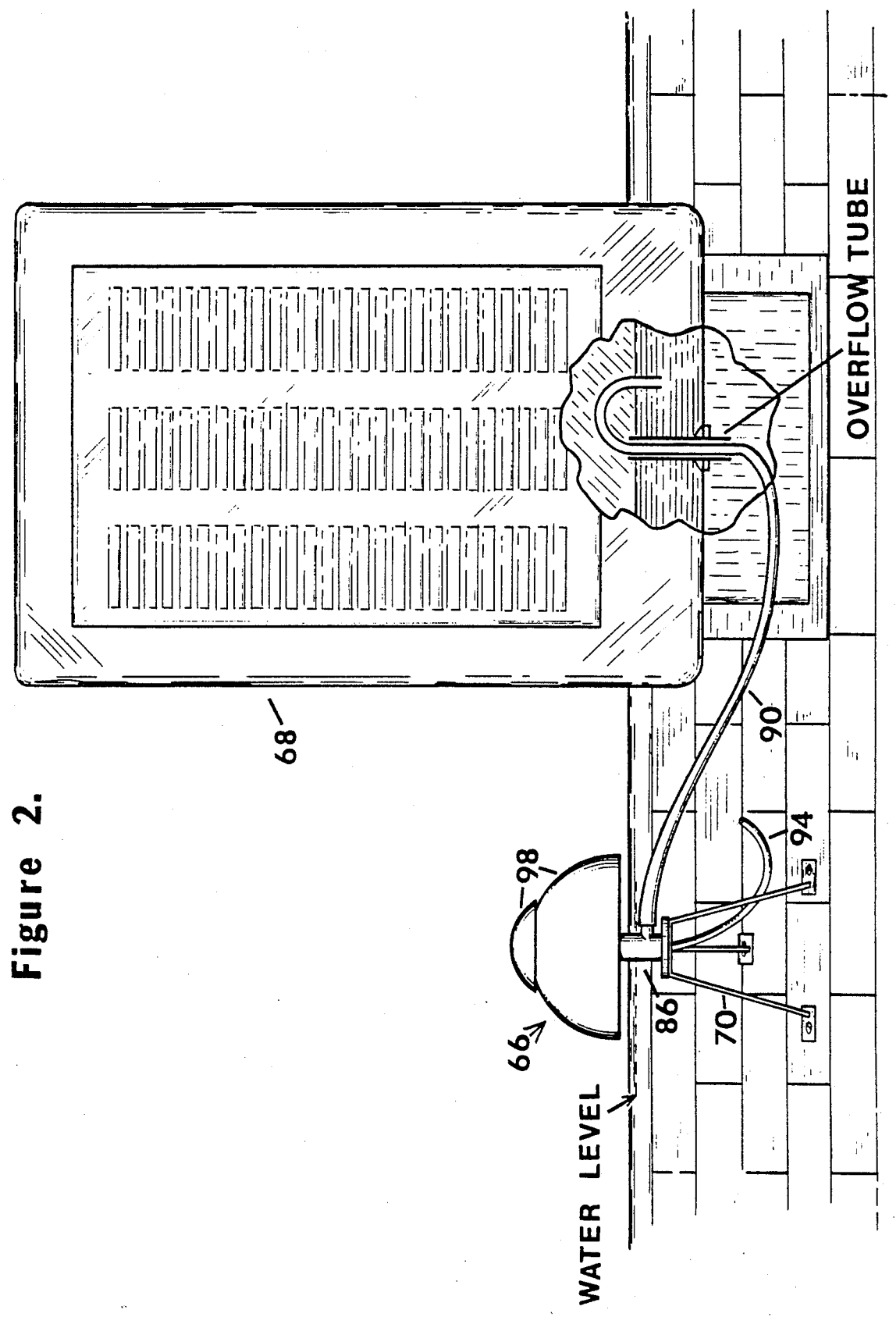
FIG. 2 is a diagrammatic representation showing the mounting for a humidity sensor for the control system of FIG. 1, where both an evaporative cooler and an air conditioner are under common control.
Figure 3:
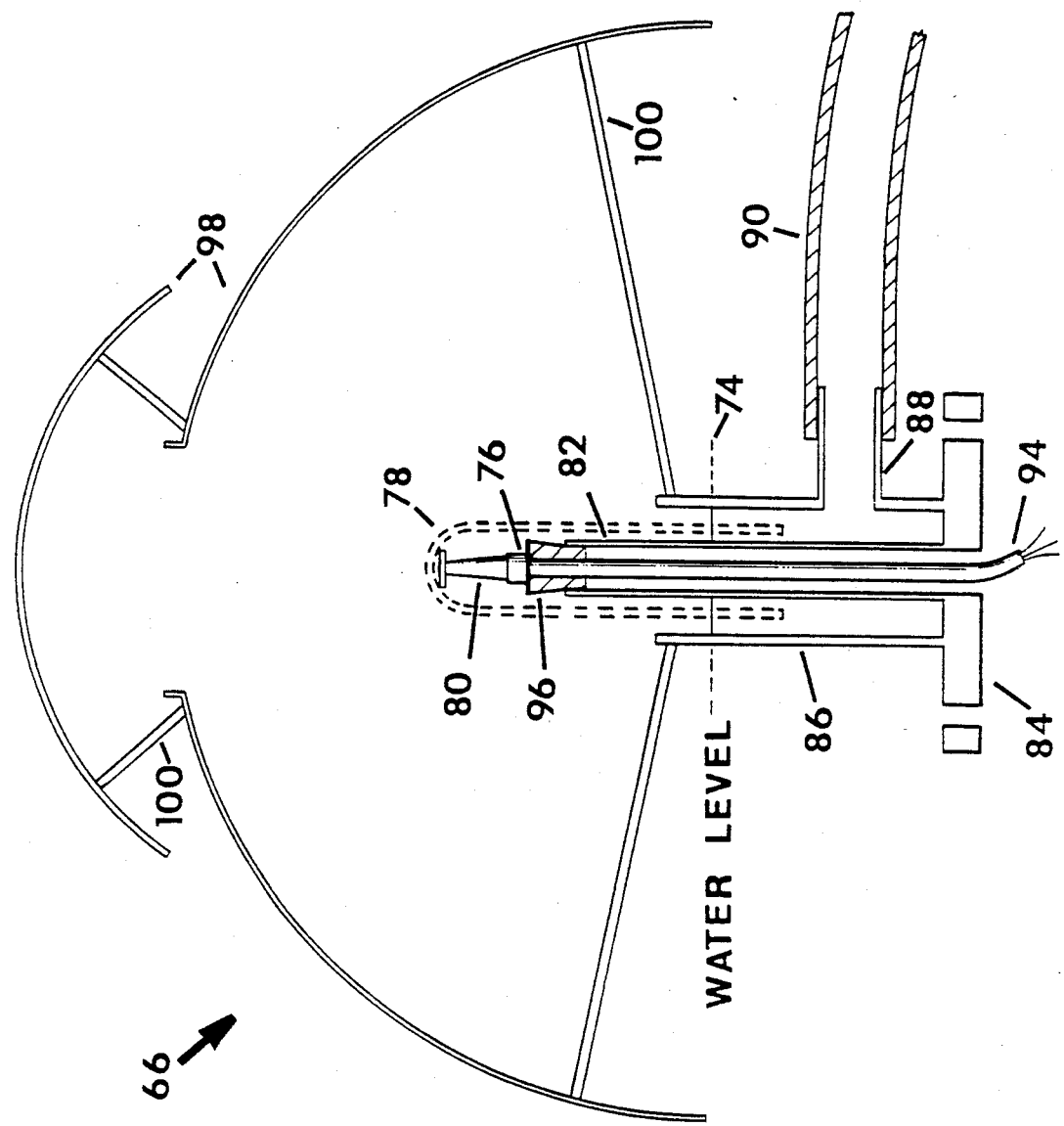
FIG. 3 is a vertical section through the humidity sensor of FIG. 2.

As indicated above, evaporative coolers operate for a fraction of the cost of operating an air conditioning unit and are quite effective in regions of low humidity. However, as the humidity rises, evaporative coolers become less effective and, if the humidity is high, an evaporative cooler may even add to the discomfort of people in the space served by the cooler. In areas where humidity may vary substantially, it may be desirable to use an evaporative cooler for part of a day and to discontinue its use and to switch automatically to an air conditioner during other parts of the day. The prior art describes two such systems. We have indicated their shortcomings. As already shown, such a system cannot switch back to evaporative cooler use when humidity is reduced, unless a sensor is used to monitor relative humidity or simply wet-bulb cooling ability of the atmosphere. To enable the control system 10 of FIG. 1 to accommodate this situation, the cooling sensor, indicated generally at 66 in FIGS. 2 and 3, is employed. As seen in FIG. 2, the cooling sensor 66 is mounted adjacent to the evaporative cooler, indicated generally at 68, and is supported by a suitable stand 70 and is supplied with water from the cooler 68 maintained at a level 74 by the float valve, not shown, of the cooler 68.

As best seen in FIG. 3, the cooling sensor 66 comprises a temperature sensor 76, identical to the sensor 12 of FIG. 1, located within a water-absorptive sock 78. A spacer 80 serves to prevent the sock 78 from touching the sensor 76. The sensor 76 is mounted on the upper end of a tube 82 which projects upwardly from a base 84 and a sump 86 also projects upwardly from the base 84 encircling the tube 82 and the lower end of the sock 78. The sump 86 has an inlet tube 88 which is connected by a suitable hose 90 which supplies water from the cooler 68. As best seen in FIGS. 2 and 3, the humidity sensor 66 is mounted on a stand 70 at a position such that the water level 74 maintained by the float valve, not shown, of the cooler 68 will be above the bottom of the sock 78 within the sump 86. The temperature sensor 76 is electrically connected to the control system 10 of FIG. 1 by conductors 92 contained within a flexible cable 94 and a suitable seal 96 protects the connection between sensor 76 and conductors 92. Finally, a suitable weather shield 98 is mounted over the sensor assembly, as best seen in FIG. 3, by suitable means, such as brackets 100. If desired, the brackets 100 may be formed of a coarse mesh to prevent entry of birds beneath the shield 98.

With the cooling sensor 66 mounted in still air, it is found that the temperature sensor 76 generates a signal indicating a temperature 2 to 4 degrees above the reading of a conventional forced-air wet-bulb thermometer.

If the cooling sensor 66 is mounted where it is subject to natural air movements, the temperature indicated by sensor 76 will be approximately 0 to 2 degrees higher than that of a conventional wet-bulb thermometer. In either event, the signal from sensor 76 may reliably be used as a measure of the lowest cooling temperature achievable by evaporation at that time. The signal from the sensor 76 is, therefore, compared to the present reference voltage derived from the limit temperature preset on the scale of potentiometer 108 by comparator 106, shown in FIG. 4. When said signal rises at 104 to within one millivolt of the preset reference voltage at comparator terminal 110, comparator 106 switches, producing a low to inverter 114 and reducing the voltage at comparator terminal 110 by 50 millivolts, thereby locking the comparator at a low output until the signal from sensor 76 decreases by 50 millivolts, indicating a 5 degree drop in cooling temperature. Inverter 114 passes a high signal to alert the pump inhibiting inverter 36 of the evaporative cooler pump 40 of the control circuit 10 of FIG. 1. Also, the signal from inverter 114 is passed through isolation diodes 116, 118 and 120 to turn "Off" the pump latch 42 and blower latch 48 of the evaporative cooler control circuit 10 and to prevent the pump inverter 36 from attempting to restart the cooler. Meanwhile, comparator 106 provides "Air Conditioner Ready" signals to terminal 122 and to input 124 of inverter 126. Next, the signal from inverter 106 is supplied to input 128 of analog switch circuit 130, while the signal from inverter 114 is supplied to input 132 of switch 130. The analog switch circuit 130 serves to connect resistor 134 in shunt with resistor 140, causing the hysteresis of comparator 22 of control circuit 10 to change from 0.2 degrees to 3.0 degrees, (30 millivolts) making the on-to-off differential of comparator 22 correct for air conditioner control. Amplifier 126 serves as an OR gate so that when low signals arrive at input 124 of amplifier 126, simultaneously, from both comparators 106 and 22, inverter 126 passes a low signal to the base of transistor 140, allowing transistor 144 to conduct, energizing relay 142 which switches the air conditioner "On". From this point on, temperature sensor 12 of the control circuit 10 of FIG. 1 serves to regulate the performance of the air conditioner through comparator 22. Subsequently, when atmospheric conditions have changed sufficiently that the signal generated by cooling sensor 102 drops by 50 millivolts or more, comparator 106 output goes high, causing the air conditioner to turn "Off" and restoring operation of the evaporative cooler to the control circuit 10 of FIG. 1 and with the hysteresis of comparator 22 restored to 0.2 degrees.

Figure 4:
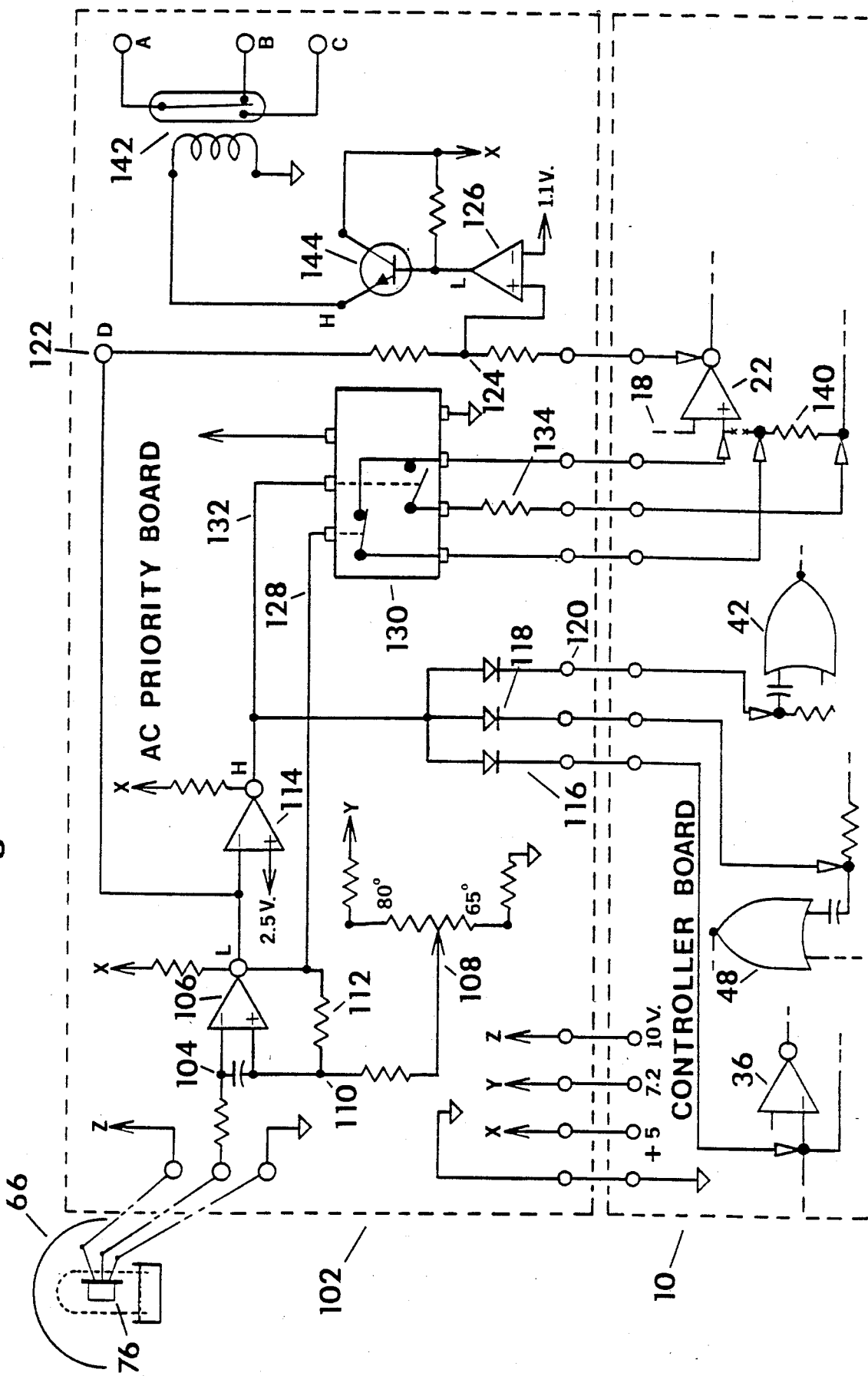
FIG. 4 is a diagrammatic representation showing the control system of FIG. 1 with added circuitry for controlling both an evaporative cooler and an air conditioner.

It will be apparent to those skilled in the art that the circuits of FIGS. 1 and 4 may, if desired, be miniaturized and formed on one or more integrated circuit chips. Moreover, numerous other variations and modifications can, obviously, be made without departing from the spirit of the present invention. Therefore, it should be clearly understood that the forms of the present invention described above and shown in the accompanying drawings are illustrative only and are not intended to limit the scope of the present invention.

I claim:

1. An automatic control system for an evaporative cooler having a pump and a blower; said control system comprising:
    a solid state electronic temperature sensing circuit,
    a timer responsive to signals from said temperature sensing circuit for activating said pump a predetermined period prior to activation of said blower and deactivating said pump after a predetermined period after said blower has ceased,
    means actuable by a signal from said timer for actiting and cycling said blower between high speed and low speed operation, and
    logic circuit means for correctly sequencing the operation of said control system.

2. The control system of claim 1 further comprising:
    humidity sensing means for developing an electrical signal indicative of excessive atmospheric humidity, and
    means responsive to a signal from said humidity sensing means above a preselected value for turning off said pump and blower.

3. An automatic control system for an evaporative cooler having a pump and a blower; said control system comprising:
    a solid state electronic temperature sensing circuit;
    comparison means connected to receive signals from said sensing circuit and serving to compare said signals with a preselected voltage and, when said signals are beyond a predetermined range of said voltage to pass an electrical signal;
    a timer responsive to said signals from said comparison means,
    logic circuit means responsive to signals from said timer and serving to activate said pump a predetermined period prior to activation of said blower;
    means actuable by signals from said timer and said logic circuit for activating and cycling said blower between high speed and low speed operation; and
    latch means responsive to activation of said pump to prevent deactivation of said pump for a predetermined interval following deactivation of said blower.

4. The control system of claim 3 further comprising:
    humidity sensing means for developing an electrical signal indicative of humidity, and
    means responsive to a signal from said humidity sensing means above a preselected value for turning off said pump and blower.

5. The control system of claim 4 further comprising: an air conditioner; and
    means responsive to a signal from said humidity sensing means above a preselected value for deactivating said evaporative cooler and activating said air conditioner and responsive to said signal from said humidity sensing means falling below said preselected value to deactivate said air conditioner and reactivate said evaporative cooler.

6. The control system of claim 3 wherein:
    said preselected range of voltage is 2.0 to 5.0 millivolts.

7. The control system of claim 3 wherein:
    said temperature sensing circuit generates electrical signals of approximately 10 millivolts per degree Fahrenheit.

8. The control system of claim 5 further comprising:
    said preselected range of voltage is 2.0 to 5.0 millivolts, respectively; and
    means responsive to said signal from said humidity sensing means for switching said voltage range when said air conditioner is activated.

9. The control system of claim 3 further comprising:
    said logic system being formed on a single integrated circuit chip.

10. The control system of claim 4 wherein:

said humidity sensing means comprises:

a solid-state electronic temperature sensing device;

a water-absorbent sock encircling said temperature sensing device;

sump means containing water and maintaining the level of said water in contact with said sock; and cover means protecting said temperature sensing device and said sock from direct sunlight but allowing ambient weather conditions to reach said sensing device and said sock.

* * * * *